United States Patent
Akatsu

[19]
[11] Patent Number: 5,982,890
[45] Date of Patent: Nov. 9, 1999

[54] METHOD AND SYSTEM FOR DETECTING FRAUDULENT DATA UPDATE

[75] Inventor: Masaharu Akatsu, Menlo Park, Calif.

[73] Assignee: Hitachi, Ltd., Tokyo, Japan

[21] Appl. No.: 08/861,594

[22] Filed: May 22, 1997

[30] Foreign Application Priority Data

May 24, 1996 [JP] Japan .................................. 8-129572

[51] Int. Cl.⁶ ..................................................... H04L 9/00
[52] U.S. Cl. .................................... 380/4; 380/2; 380/23; 380/25; 380/49; 380/50; 395/186; 395/187.01
[58] Field of Search .................................... 380/4, 23, 24, 380/25, 49, 50, 59, 2, 29, 30; 395/186, 187.01

[56] References Cited

U.S. PATENT DOCUMENTS

| | | | |
|---|---|---|---|
| 5,530,757 | 6/1996 | Krawczyk | 380/23 |
| 5,619,571 | 4/1997 | Sandstrom et al. | 380/4 |
| 5,694,569 | 12/1997 | Fischer | 380/4 X |

FOREIGN PATENT DOCUMENTS

| | | |
|---|---|---|
| 635957 | 1/1995 | European Pat. Off. . |
| 654920A2 | 5/1995 | European Pat. Off. . |
| 62-32544 | 2/1987 | Japan . |

OTHER PUBLICATIONS

"Information Security," Nikkei McGraw–Hill Corp. 1987, pp. 243–249, (In Japanese).
Thomas Hardjono et al, "Database Authentication Revisited", Computers & Security International Journal Devoted to the Study of Technical and Financial Aspects of Computer Security, vol. 13, No. 7, Jan. 1, 1994, pp. 573–580.
S. Albert et al, "Reference Model For Data Management Security and Privacy", Sigsac Review, vol. 10, No. 2/03, Jan. 1, 1992, pp. 44–62.

Primary Examiner—Bernarr E. Gregory
Attorney, Agent, or Firm—Beall Law Offices

[57] ABSTRACT

A method and system for detecting fraudulent data update of databases connected to a plurality of distributed computers in which a monitor computer connected via a network to the distributed computers detects fraudulent data update. The monitor computer collects initial data of the databases of the distributed computers via the network to generate parities for data at same storage fields and store them in a monitor database. Each time the databases connected to the distributed computers are updated, a parity update unit of the monitor computer generates new parities from data before and after the update and old parities and replaces the old parities stored in the monitor database by the new parities. At an auditing time, the monitor computer collects latest data of the distributed databases and generates parities which are compared with the corresponding parities already stored in the monitor database to detect an inconsistency of both parities.

14 Claims, 8 Drawing Sheets

| ROW NO. | DATE (M/D) | CUSTOMER NO. | PRODUCT NO. | QUANTITY | MONEY AMOUNT |
|---|---|---|---|---|---|
| 1 | 01/20 | 0125 | 573 | 10 | 20000 |
| 2 | | | | | |
| 3 | | | | | |
| 4 | | | | | |
| 5 | | | | | |
| ⋮ | | | | | |
| n | | | | | |

21, 31, 41

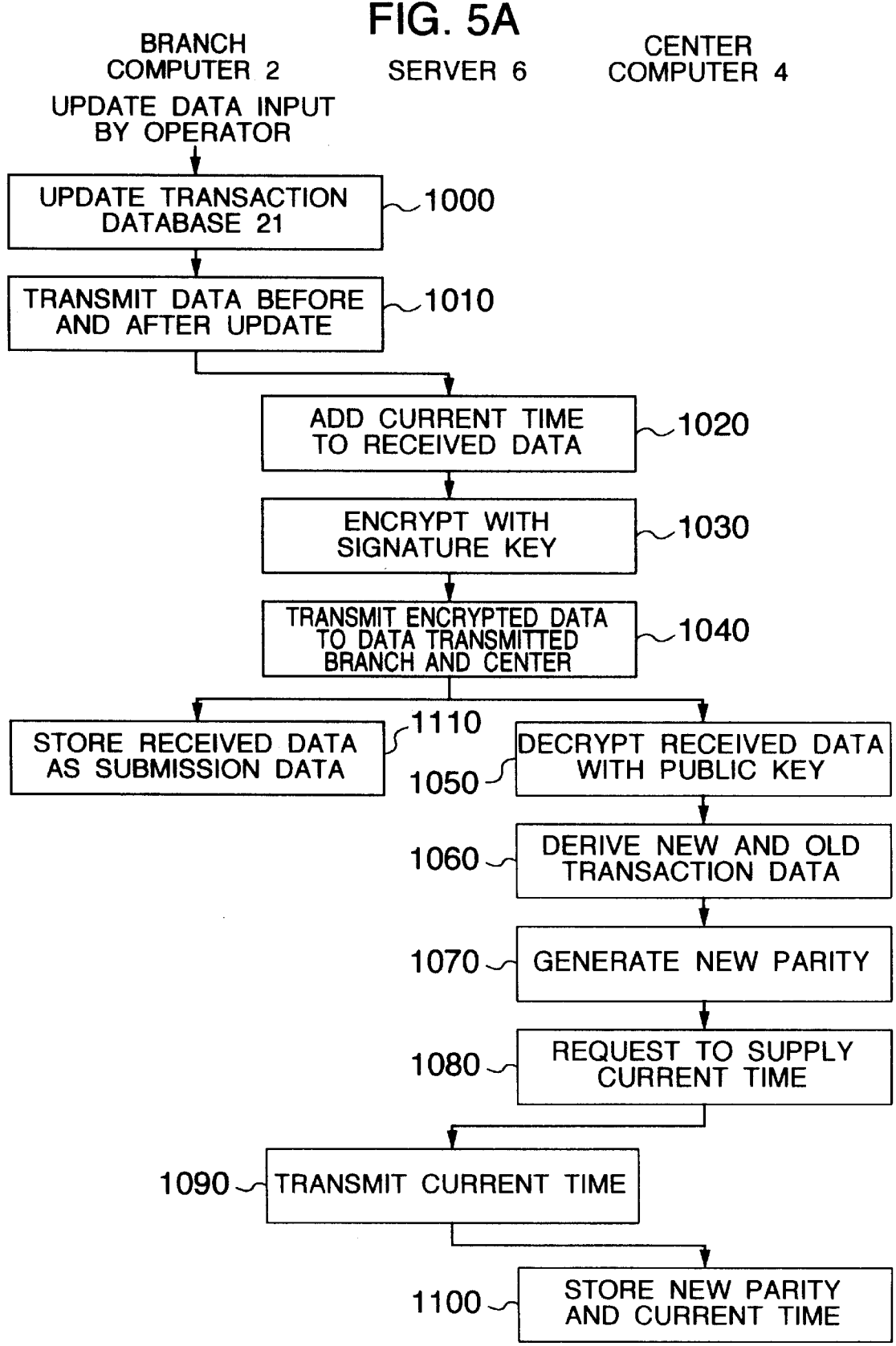

METHOD AND SYSTEM FOR DETECTING FRAUDULENT DATA UPDATE

BACKGROUND OF THE INVENTION

1. Field of the Invention

The present invention relates to updating distributed databases, and more particularly to a method and system for detecting fraudulent data update.

2. Description of the Related Art

Operating systems (OS) of computers are provided with a security function such as access control and file protection in order to prevent fraudulent update of files and databases. For example, as a user logs in a computer, the operating system checks the password and a database access privilege to thereby limit database update to specific persons. Since the operation system stores data update log, it is possible to check fraudulent data update by unprivileged persons. Computer security technology is described, for example, in "Information Security", Nikkei McGraw-Hill Corp., 1987, pp. 243–249.

Conventional security technology is effective for the prevention of fraudulent data update by unprivileged persons, however, it cannot deal with fraud by insiders having data update privilege. It is not easy to detect fraudulent data update by insiders of databases, particularly databases distributed at factories, sales offices, business offices and the like of companies and monetary institutes.

SUMMARY OF THE INVENTION

It is therefore an object of the present invention to provide a method and system for detecting fraudulent or unauthorized data update by insiders of databases of a distributed computer system, capable of allowing third parties to check fraud.

In order to achieve the above object, according to one aspect of the present invention, there is provided a method of detecting fraudulent or unauthorized data update for a computer system including distributed databases and local computers at local sales offices and local business offices, a monitor computer, and a network interconnecting the local and monitor computers, comprising the steps, to be executed by the monitor computer, of: generating parity data of initial data collected from respective sites of the databases at each of same storage fields and storing the generated parity data; generating, each time data in each database is updated, new parity data from data before and after the update and old parity data to replace the old parity data by the new parity data; comparing parity data generated at an auditing time from latest data stored in the databases at each of the same storage fields, with the parity data already stored; and determining, if the comparison result indicates an inconsistency of both the parity data, that data in the databases was updated fraudulently.

If the data in the distributed databases is not coincident with the corresponding data already transmitted to the monitor computer, both the parity data are inconsistent so that fraudulent data update can be detected.

Other objects, features and advantages of the present invention will become apparent from reading of the following description of the preferred embodiments taken in conjunction with the accompanying drawings.

BRIEF DESCRIPTION OF THE DRAWINGS

FIG. 5A is a flow chart illustrating the procedures to be executed by computers of the embodiment.

DETAILED DESCRIPTION OF THE PREFERRED EMBODIMENTS

Embodiments of the invention will be described in detail with reference to the accompanying drawings.

Figure 1:
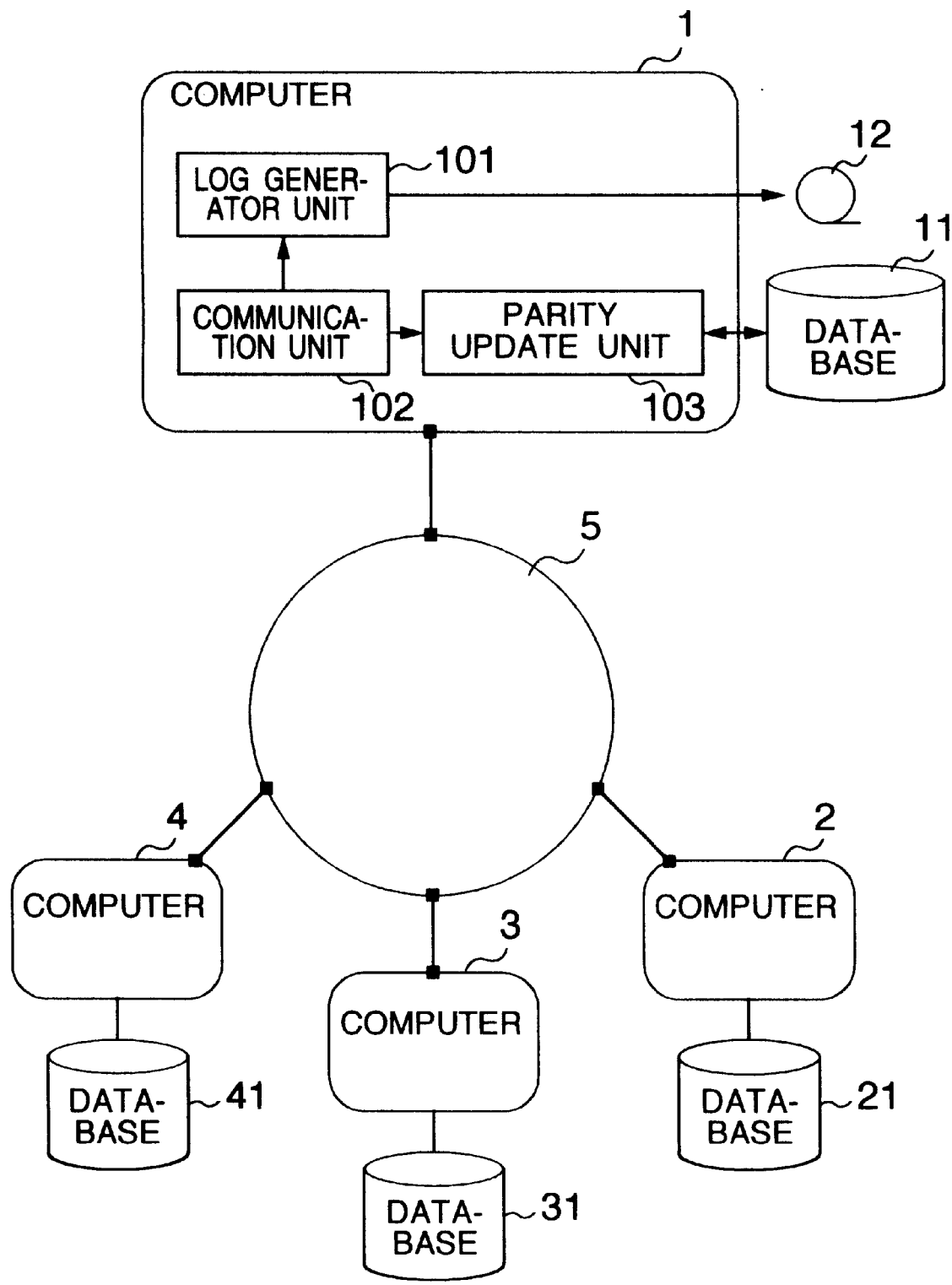
FIG. 1 is a schematic diagram showing the structure of a computer system according to an embodiment of the invention.

FIG. 1 is a schematic diagram showing the structure of a computer system which can be used for embodying a method of detecting fraudulent data manipulation. Reference numerals 2, 3 and 4 represent computers installed at local business offices (branches) for processing information such as totaling sales amounts and customer management at each branch. Reference numerals 21, 31 and 41 represent databases for storing sales data and transaction data, the databases 21, 31 and 41 being stored in storage units connected to the computers 2, 3 and 4. Reference numeral 1 represents a computer installed at a main business office (center) and connected to the computers 2, 3 and 4 via a network such as a LAN. The computer 1 stores data before and after update received from the computers 2, 3 and 4 in its update data log, and calculates a new parity of the stored data to replace the already stored parity by the new parity. Reference numeral 12 represents the update log, and reference numeral 11 represents a relational database for storing parity information. The database 11 and update data log 12 are stored in a storage unit connected to the computer 1. Reference numeral 101 represents a log generator unit for generating log information in accordance with data received from the computers 2, 3 and 4 and stores it in the update data log 12. Reference numeral 103 represents a parity update unit for generating a new parity in accordance with data before and after update received from the computers 2, 3 and 4 and a corresponding old parity and replacing the old parity stored in the data base 11 by the new parity. Generating a new parity may be achieved through an EX-OR calculation between the old parity and a difference between data before and after update. Reference numeral 102 represents a communication unit for controlling information transfer via the network 5 to and from the computers 2, 3 and 4. The log generator unit 101 and parity update unit 103 are realized by executing programs stored in the storage unit of the computer 1. The communication unit 102 is realized by communication hardware of the computer 1 and execution of programs stored in the storage unit of the computer 1.

Figures 2, 3:
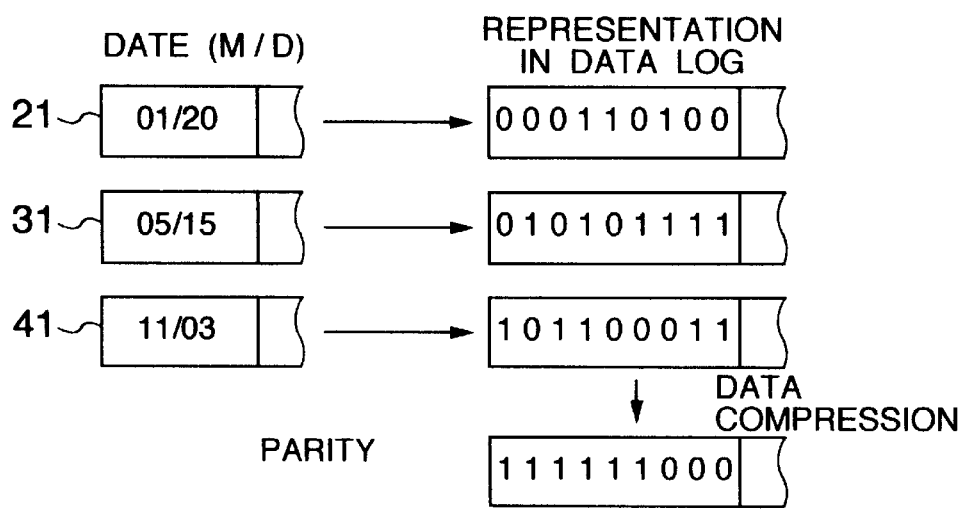
FIG. 2 is a diagram showing the data format of a database of transaction data of the embodiment.
FIG. 3 is a diagram illustrating a process of generating a parity from data of one data item.

FIG. 2 shows an example of the format of business transaction data stored in one of of the databases 21, 31 and 41. The transaction data is constituted of a plurality of rows or records. Each row is constituted of data items including a transaction date (month/day), a customer number, a product number, a transaction quantity, a transaction money amount, and the like. The number of digits representing data of each data item takes a predetermined number. Deletion and addition of a row or record of this relational database is one kind of record update operation. Namely, deleting a record is an operation of changing the contents of an original record to all binary 0's, whereas adding a record is an operation of adding a record having the contents of all 0's.

FIG. 3 is a diagram illustrating the generation of a parity from data of each data item. For example, the data of transaction date (month/day) at the first row of transaction data of one of the relational databases 21, 31 and 41, shown at the left side of FIG. 3, is represented by binary values shown at the right side thereof, and the even parity generated from these data is shown at the right bottom thereof. Parities for other data items such as customer number are generated in the same manner as above by using data of customer numbers stored in the same storage field of the database of transaction data. The number of digits of a parity for each data item is the same as the number of digits of data in each data item.

Records of the update data log 12 are constituted of a transmission branch name, a reception time, a database name, a row number, new data and old data. The database 11 stores parity information in correspondence with each database in each of the databases 21, 31 and 41. For example, in the case of a database of transaction data, parity information is provided in correspondence with each data item such as date, customer number, and so on, and the total number of records is equal to the maximum number of transaction data in the databases 21, 31 and 41.

Prior to starting the system operation, the parity update unit 103 of the computer 1 collects as initial data the data stored in each database of each of the databases 21, 31 and 41 of the computers 2, 3 and 4, generates a parity for each data item of each record of each database, and stores it in the database 11. If there is a branch having no record in its database, no parity is generated, and parities for data items are generated only for those branches having records in their databases.

After the system starts, the computers 2, 3 and 4 at branches transmit new and old data to the computer 1 each time a new transaction occurs and record data is updated. For addition/deletion of a record, an addition/deletion record with an addition/deletion discriminator is transmitted. The communication unit 102 of the computer 1 receives the transmitted data via the network 5, and the log generator unit 101 generates log data in accordance with the received data and stores it in the update data log 12. The parity update unit 103 calculates a new parity for each data item by using the following formula and updates the database 11.

New parity = Old parity RECEIVED New data RECEIVED old data where RECEIVED is an exclusive logical sum. There is no old data for a record addition, and there is no new data for a record deletion.

The parity update unit 103 of the computer collects periodically or at an auditing time the latest data in each database of each of the data bases 21, 31 and 41 of the computers 2, 3 and 4, generates a parity for each data item of each record of each database, and compares this parity with the corresponding parity stored in the database 11. If both the parities are not coincident, it means that fraudulent data update was performed at some branch. Examples of such fraudulent data update are not reporting report data update by the computer at some branch to the computer 1 at the main office, and reporting update data different from the update data stored in the database at some branch to the computer 1 at the main office. In the latter case, the parity update unit 103 detects the database name, row number, and data item for which the fraudulent data update was performed, and thereafter, in accordance with the detected information, an unrepresented processing unit of the computer 1 searches the update data log 12 to identify the branch name and reception time when the data item was updated fraudulently.

In the above embodiment, parities are generated for all data items stored in databases. For the parity comparison, a parity only for a specific data item such as an order number and a money amount may be used.

Figure 4:
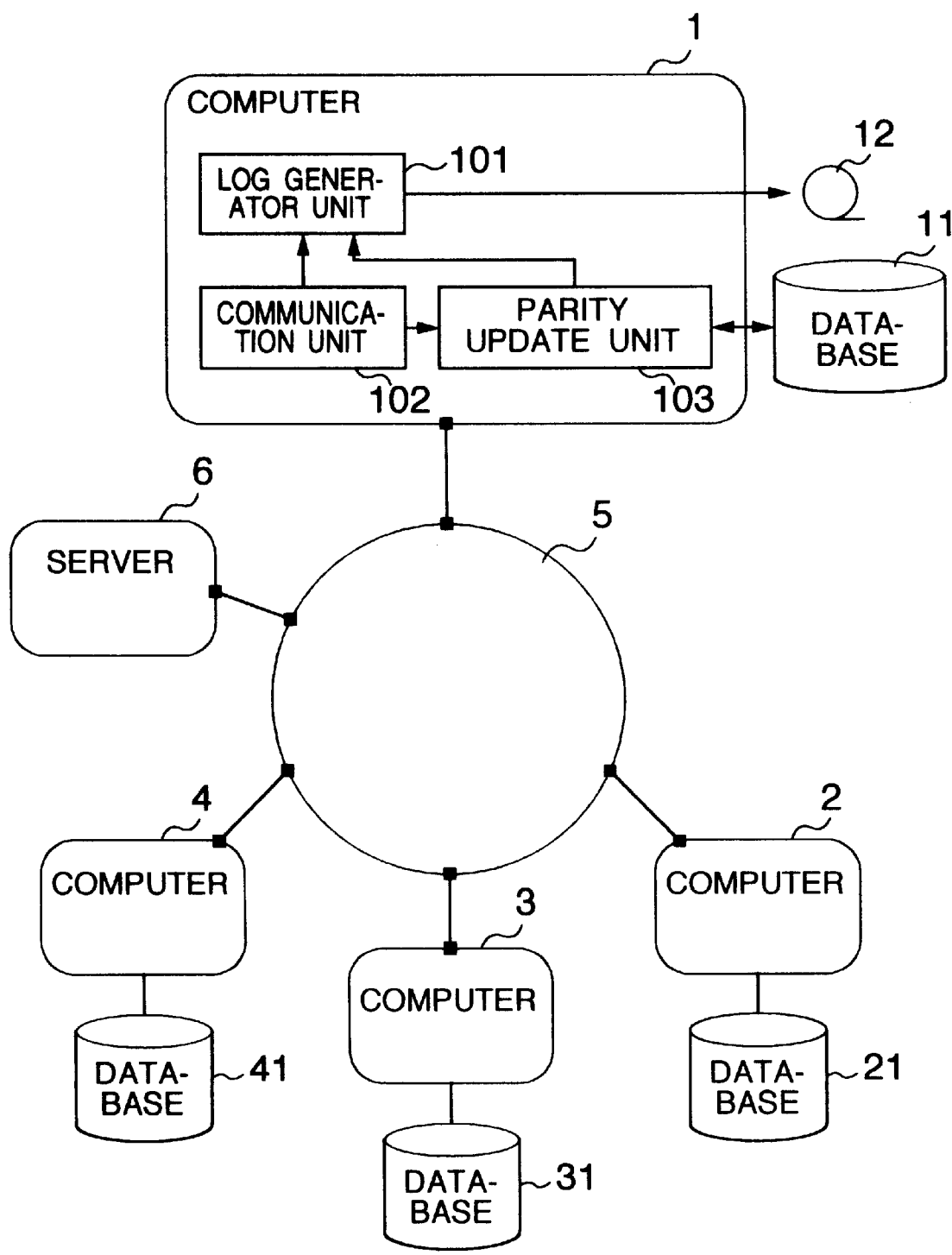
FIG. 4 is a schematic diagram showing the structure of a computer system according to another embodiment of the invention.

FIG. 4 is a schematic diagram showing the structure of a computer system according to another embodiment of the invention. This system has an encrypting server 6 in addition to the structure of the system shown in FIG. 1. The processes to be executed by the parity update unit 103 and log generator unit 101 are modified to change the contents of the update data log 12. The server 6 adds a current time to data received from the computers 2, 3 and 4, encrypts the data added with the current time and transmits it to the computers 1, 2, 3 and 4. The parity update unit 103 decrypts the encrypted data received from the server 6 via the network 5, generates a parity for the data after and before update to store it in the database 11, and operates to store a time when the parity was generated in the update data log 12. In this embodiment, a digital signature system using a pubic key is used in which data is enciphered by using a signature key (secret key) and deciphered by using a public key.

Figure 5B:
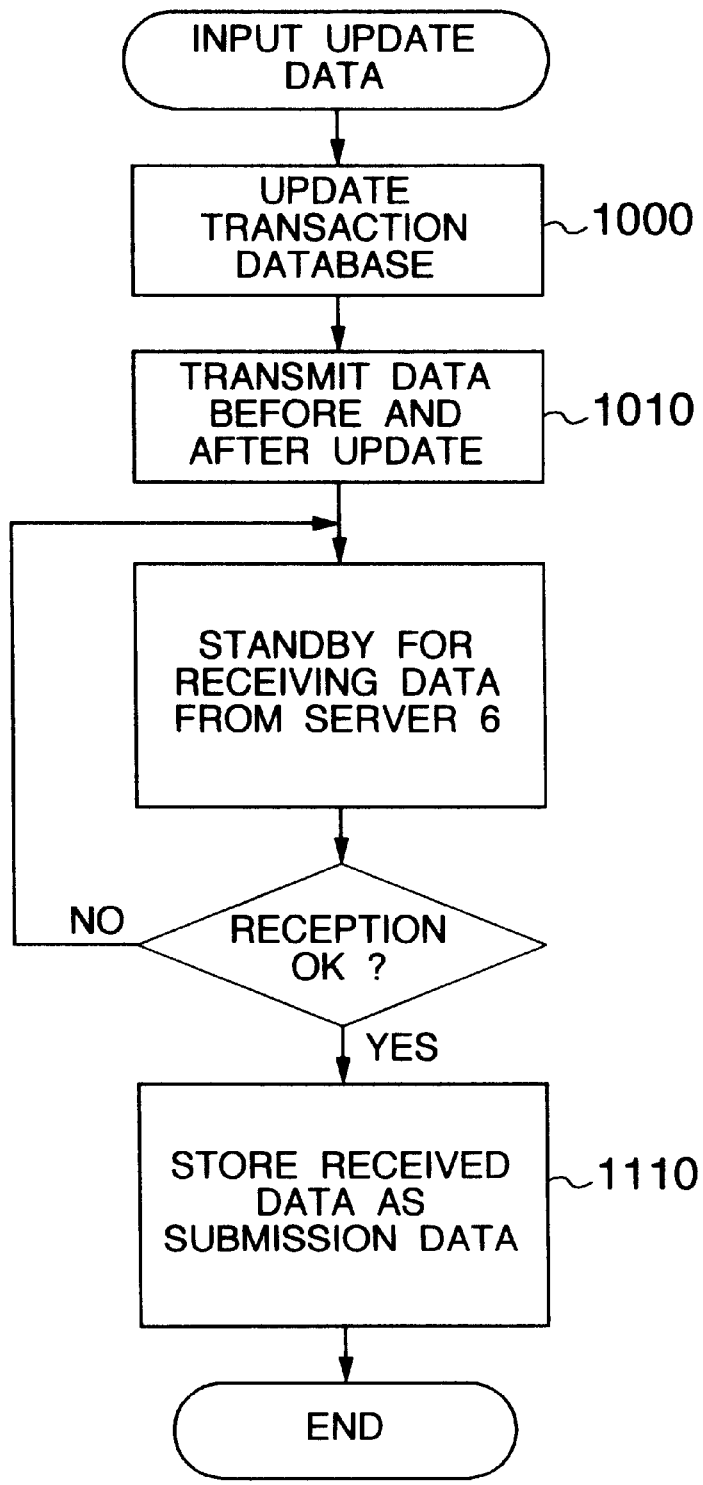
FIGS. 5B to 5D are flow charts illustrating the process steps (programs) to be executed by a distributed system including branch, server, and center (main business office) computers.
Figure 5C:
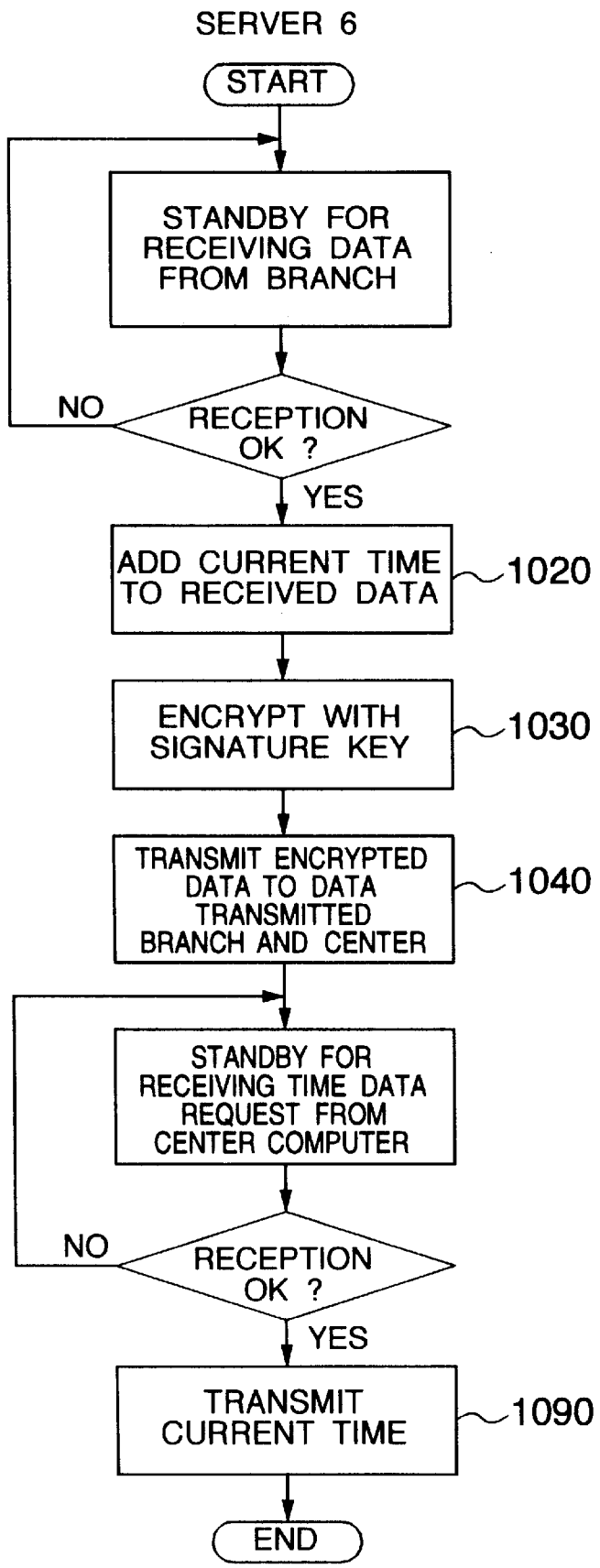
Figure 5D:
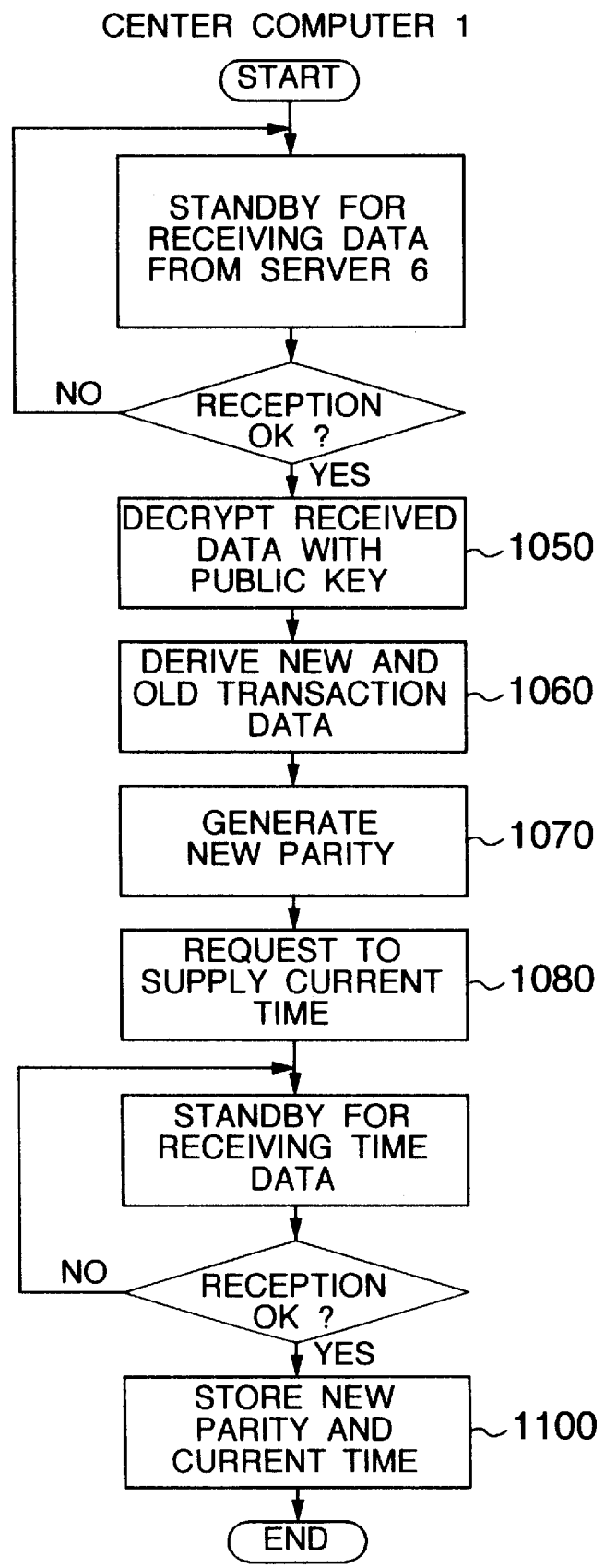

FIG. 5A is a flow chart illustrating the procedures to be executed by the computers 2, 3 and 4, server 6 and computer 1. As operators enter update data, the computers 2, 3 and 4 at the branches update the databases 21, 31 and 41 (Step 1000), and send data before and after update to the server 6 (step 1010). Upon reception of these data, the server 6 adds a current time to the data (Step 1020), encrypts the whole of the data and current time with the signature key (Step 1030), and transmits it to the data transmitted computer 2, 3 or 4 and to the monitor computer 1 via the network 5 (Step 1040). The parity update unit 103 of the computer 1 receives the encrypted data via the communication unit 102 and decrypts it with the public key (step 1050). New and old data are picked up from the decrypted data (Step 1060) to generate a new parity by using the above-described formula (Step 1070). Next, the parity update unit 103 instructs the server 6 to send the current time (Step 1080). As the server 6 sends the current time (Step 1090), the parity update unit 103 receives the current time and sends it to the log generator unit 101. The log generator unit 101 decrypts the data received from the server 6 via the communication unit 102 to generate log information which is added with the current time received from the parity update unit 103 and stored in the update data log 12 (Sep 1100). The parity update unit 103 replaces the corresponding old parity in the monitor database 11 by the new parity. The computers 2, 3 and 4 at branches receive the encrypted data from the server 6 and store it as auditing submission data (Step 1110). FIGS. 5A to 5D show operation steps (programs) of the branch computers, server and center computer. These operation steps are realized by programs to be executed by a corresponding computer, and these programs may be stored in a storage medium including a computer readable memory.

Figure 6:
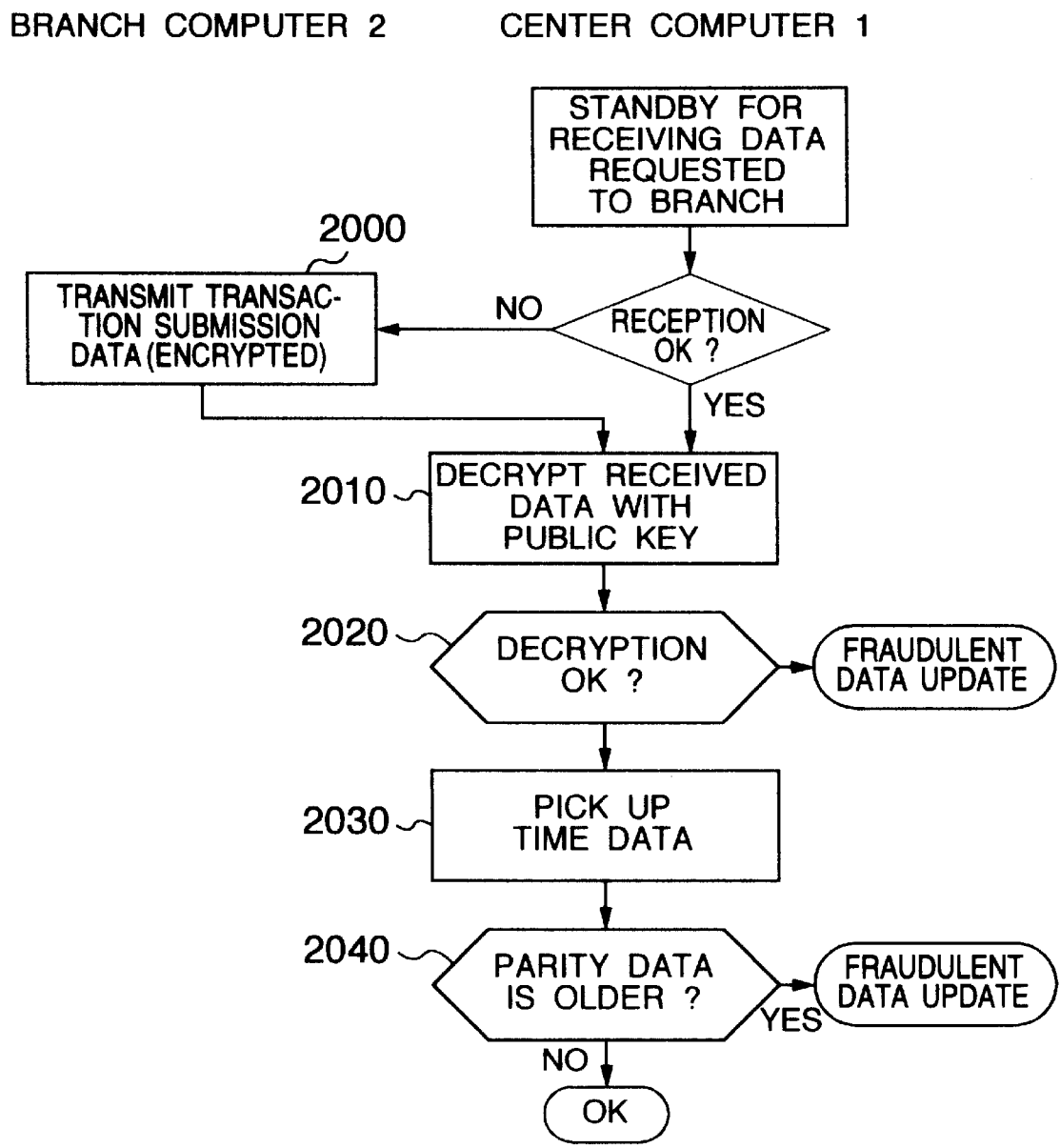
FIG. 6 is a flow chart illustrating the procedures to be executed by computers of the embodiment at an auditing time.

FIG. 6 is a flow chart illustrating the procedures to be executed by the computers 2, 3, 4 and 1 at an auditing time. The computers 2, 3 and 4 transmit the stored submission data to the computer 1 (Step 2000). An unrepresented processing unit of the computer 1 receives the transmitted data and decrypts it with the public key (Step 2010). If the decrypted data does not contain a defined data attribute, it is judged that there was a fraudulent data update at some branch (Step 2020). A record corresponding to the received data is acquired from the update data log 12 and a parity update time is derived from this record (Step 2030) to compare it with the data update time received from the branch (Step 2040). If the parity update time is older than the data update time, it is judged that there was a fraudulent data update at the branch (Step 2040). Programs for realizing branch audit process steps may be stored in a storage medium including a computer readable memory. Programs for realizing the process steps shown in FIGS. 5B to 5D and FIG. 6 may be downloaded from an external system into a corresponding computer.

In this embodiment, if any of the computers 2, 3 or 4 transmits to the computer 1 the data which was not processed by the server 6, the computer cannot decrypt this data so that fraudulent data update can be detected. Furthermore, if the parity update time is older than the data update time for the same data item, it can be determined that the data was updated fraudulently.

According to the present invention, the contents of a database are converted into parity data for the data comparison and verification. Therefore, fraudulent data update by insider frauds can be detected. The invention is effectively applicable to on-line institutes such as banking systems and stock exchanging systems.

What is claimed is:

1. A method of detecting fraudulent data update made by distributed computers having a plurality of databases with a common data format, using a monitor computer having the same data format as that of the distributed computers and for monitoring data update of said plurality of databases, comprising the steps of:

generating parity data of initial data stored in the databases at each of same storage fields and storing the generated parity data in said database of said monitor computer;

generating, each time data in each database is updated, new parity data from data before and after the update and old parity data to replace the old parity data by the new parity data;

comparing parity data generated at a specific time from latest data stored in the databases at each of the same storage fields, with the parity data already stored; and determining, if the comparison result of said comparing step indicates an inconsistency of both the parity data, that data in the databases has been updated fraudulently.

2. A method according to claim 1, further comprising the steps, to be executed by the monitor computer, of:

storing log information in a storage unit of the monitor computer, said log information including an identifier of a data updated computer, a data updated time, and data before and after the update; and searching, when a fraudulent data update is detected, corresponding data from the log information, and deriving information including the identifier of the data updated computer and the data updated time out of the corresponding data.

3. A method according to claim 1, wherein said monitor computer executes the steps of:

generating parity data for a specific data item preselected from the databases and storing the generated parity data; and comparing the parity data for the specific data item with the corresponding parity data generated at the specific time.

4. A method according to claim 1, wherein update data transmitted from the distributed computers is encrypted and then transmitted to the monitor computer, and the monitor computer checks whether the received update data can be decrypted, and if the update data cannot be decrypted, judges that the update data is fraudulent.

5. A system for monitoring fraudulent update of distributed databases, said system configuring an intranet including a plurality of distributed databases having a common data format, distributed computers connected to respective ones of the distributed databases, a network connected to the distributed computers, and a monitor computer connected to the network for monitoring data update of the distributed databases, comprising:

said monitor computer having the same data format as that of the distributed computers and a monitor database connected to the monitor computer;

said monitor computer including:

means for generating parity data of initial data stored in the databases at each of same storage fields and storing the generated parity data in said monitor database;

means for generating, each time data in each database is updated, new parity data from data before and after the update and old parity data to replace the old parity data stored in said monitor database by the new parity data;

means for comparing parity data generated at a specific time from latest data stored in the databases at each of the same storage fields, with the parity data stored in said monitor database; and means responsive to the comparison result from said comparing means indicating an inconsistency of both the parity data for determining that data in the databases has been updated fraudulently.

6. A monitor system according to claim 5, wherein said monitor computer is a computer selected from the plurality of distributed computers connected to the network.

7. A monitor system according to claim 5, wherein the databases are relational databases, said initial parity data generating means generates parity data from initial data stored in the relational databases at each of said rows or records, and said comparing the determining means starts operating at an auditing time.

8. A monitor system according to claim 5, wherein said monitor computer further comprises:

a storage unit for storing log information including an identifier of a data updated computer, a data updated time, and data before and after the update; and means for searching, when said determining means detects fraudulent data update, corresponding data from the log information stored in said storage unit, and deriving information including the identifier of the data updated computer and the data updated time out of the corresponding data.

9. A monitor system according to claim 5, further comprising an encrypting server connected to the network, wherein said server encrypts update data transmitted from the distributed computers and then transmits the encrypted update data to the monitor computer, and the monitor computer checks whether the received update data can be decrypted, and if the update data cannot be decrypted, judges that the update data is fraudulent.

10. A monitor system according to claim 5, wherein said monitor database, said initial parity data generating and storing means, said parity data update means, said parity data comparing means, and said fraud determining means are part of a program stored in a recording medium loadable in a memory of the monitor computer and operated by executing a corresponding part of the program by the monitor computer.

11. A computer readable recording medium which stores a program to be executed by a monitor computer for detecting fraudulent data update made by distributed computers having a plurality of databases with a common data format, by using a monitor database and a monitor data log, and said monitor computer having the same data format as that of the distributed computers, said program to be executed by the monitor computer comprising:

program means for generating parity data of initial data stored in the databases at each of said storage fields and storing the generated parity data in said database of said monitor computer;

program means for generating, each time data in each database is updated, new parity data from data before and after the update and old parity data to replace the old parity data stored in the monitor database by the new parity data;

program means for comparing parity data generated at a specific time from latest data stored in the databases at each of the same storage fields, with the parity data stored in the monitor database; and program means responsive to the comparison result indicating an inconsistency of both the parity data for determining that data in the databases was updated fraudulently.

12. A recording medium according to claim 11, wherein the program to be executed by the monitor computer further comprises:

program means for storing log information in a storage unit of the monitor computer, the log information including an identifier of a data updated computer, a data updated time, and data before and after the update; and program means for searching, when a fraudulent data update is detected, corresponding data from the log information, and deriving information including the identifier of the data updated computer and the data updated time out of the corresponding data.

13. A recording medium according to claim 11, wherein said program to be executed by the monitor computer comprises:

program means for generating parity data for a specific data item preselected from the databases and storing the generated parity data; and program means for comparing the parity data for the specific data item with the corresponding parity data generated at the specific time.

14. A recording medium according to claim 11, wherein said program to be executed by the monitor computer comprises:

program means for encrypting update data transmitted from the distributed computers and then transmitting the encrypted update data to the monitor computer; and program means for checking whether the received update data can be decrypted, and if the update data cannot be decrypted, judging that the update data is fraudulent.

* * * * *